United States Patent [19]
Wolf

[11] 3,894,798
[45] July 15, 1975

[54] PROJECTOR AND METHOD FOR PROJECTING 360° PICTURES

[76] Inventor: Jesse D. Wolf, 4905 Ward Road, Wheatridge, Colo. 80033

[22] Filed: Apr. 13, 1972

[21] Appl. No.: 243,584

[52] U.S. Cl. ............... 353/122; 353/110; 352/69; 95/15
[51] Int. Cl. .......................................... G03b 21/00
[58] Field of Search ............... 353/122, 110, 35, 30; 352/69; 95/15, 16, 17; 350/7, 125; 35/12 N

[56] References Cited
UNITED STATES PATENTS

| | | | |
|---|---|---|---|
| 2,660,087 | 11/1953 | Domeshek | 353/37 |
| 2,966,096 | 12/1960 | D'Incerti et al. | 352/69 |

FOREIGN PATENTS OR APPLICATIONS

| | | | |
|---|---|---|---|
| 380,102 | 5/1922 | Germany | 95/15 |

*Primary Examiner*—Harry N. Haroian
*Attorney, Agent, or Firm*—Limbach, Limbach & Sutton

[57] ABSTRACT

A projector and method are disclosed for projecting 360° pictures or scenes wherein a wedge or substantially line image portion is taken substantially normally from an annular picture or projected image and directed along an optical axis which is folded through substantially 90° and projected on a spherical segment or cylindrical surface and the segment or line image is swept around the annular picture or projected image about a rotational axis coincident with that of the annulus and spaced from the optical axis by the focal length of the projecting optical system. Several image systems can be used to establish the image to be projected and one of such image systems can have its optical axis shifted from the axis of the annulus to the optical projection axis for properly shifting a runway in a projector and method used in an aircraft simulator.

29 Claims, 40 Drawing Figures

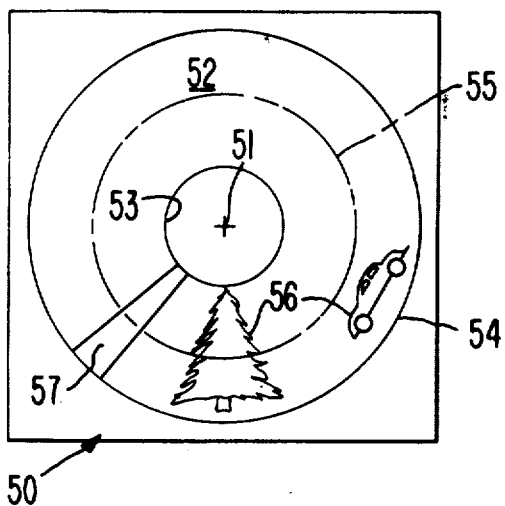
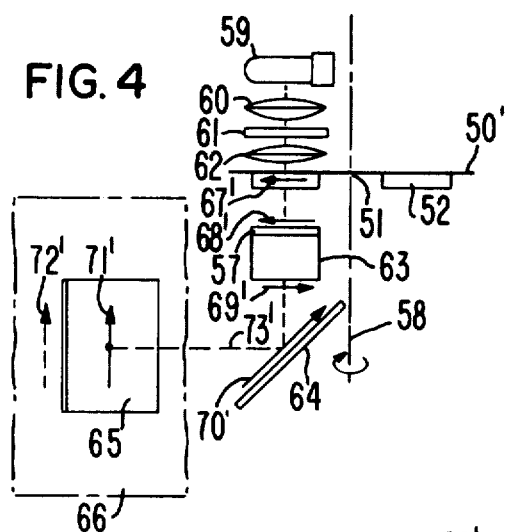
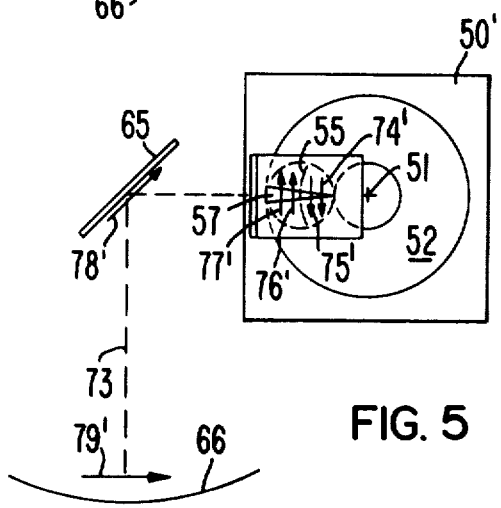
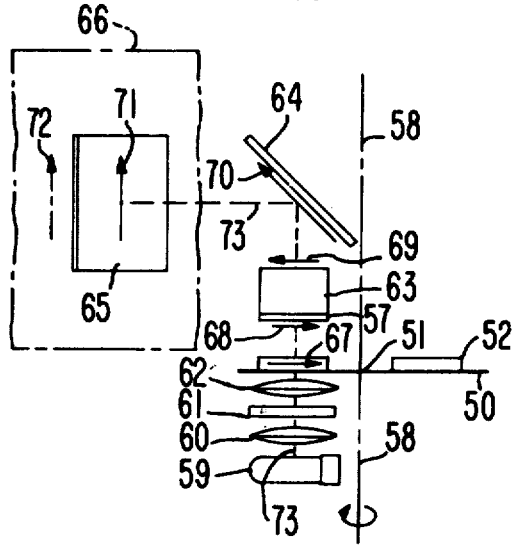
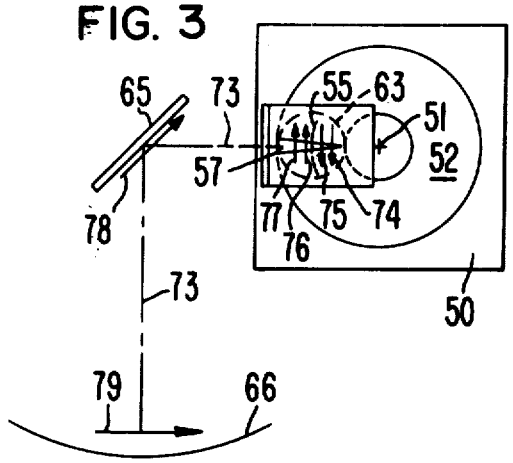

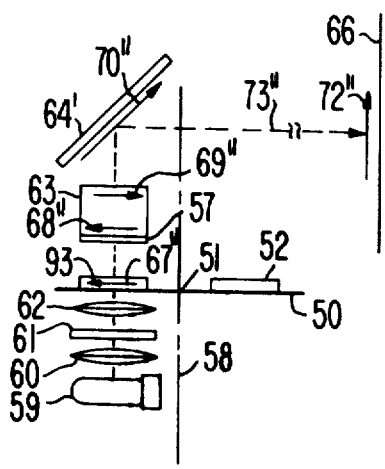
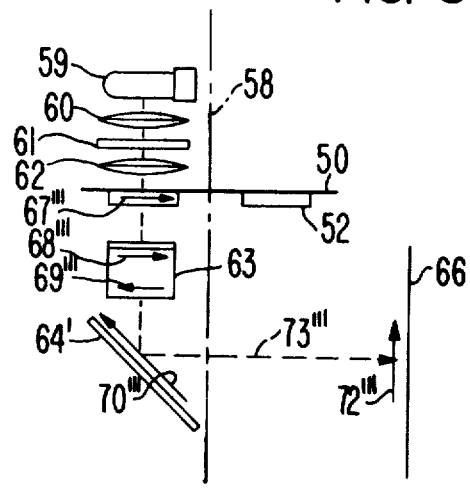
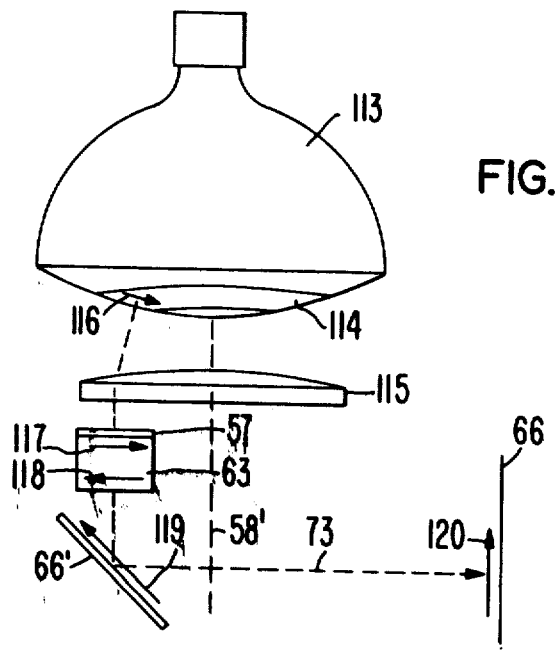

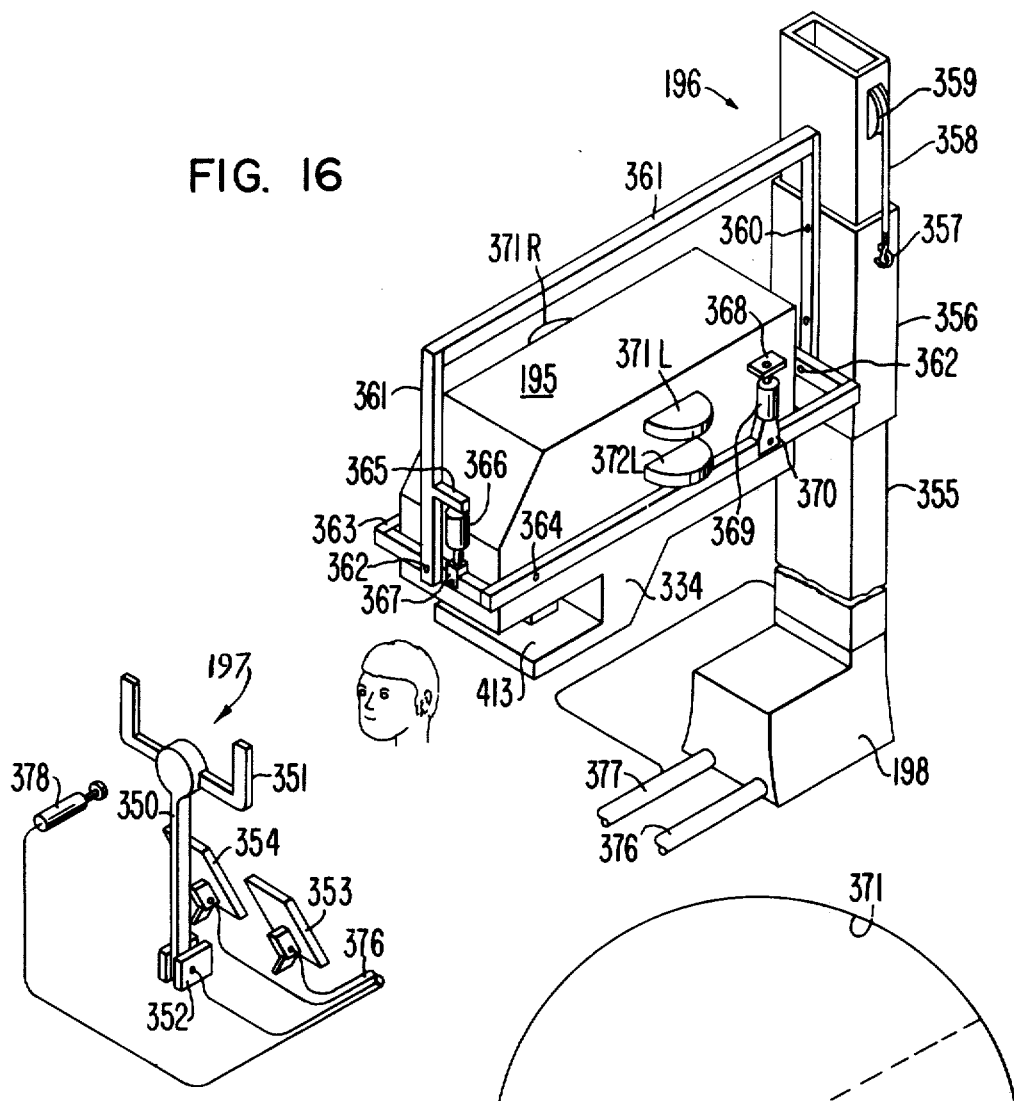
FIG. 16
FIG. 19
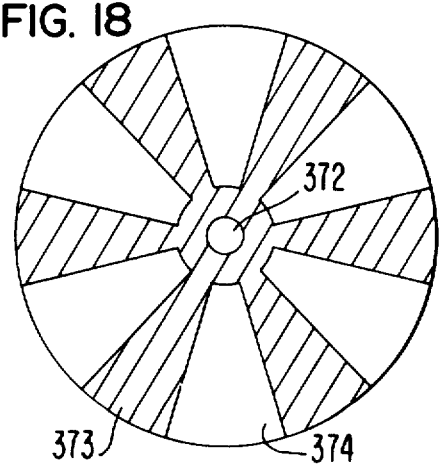
FIG. 18

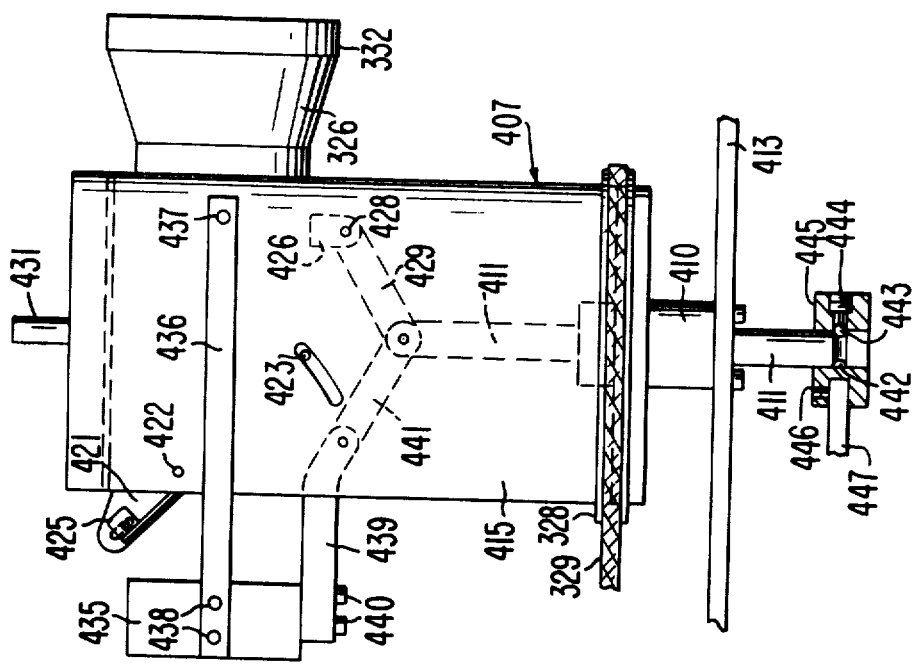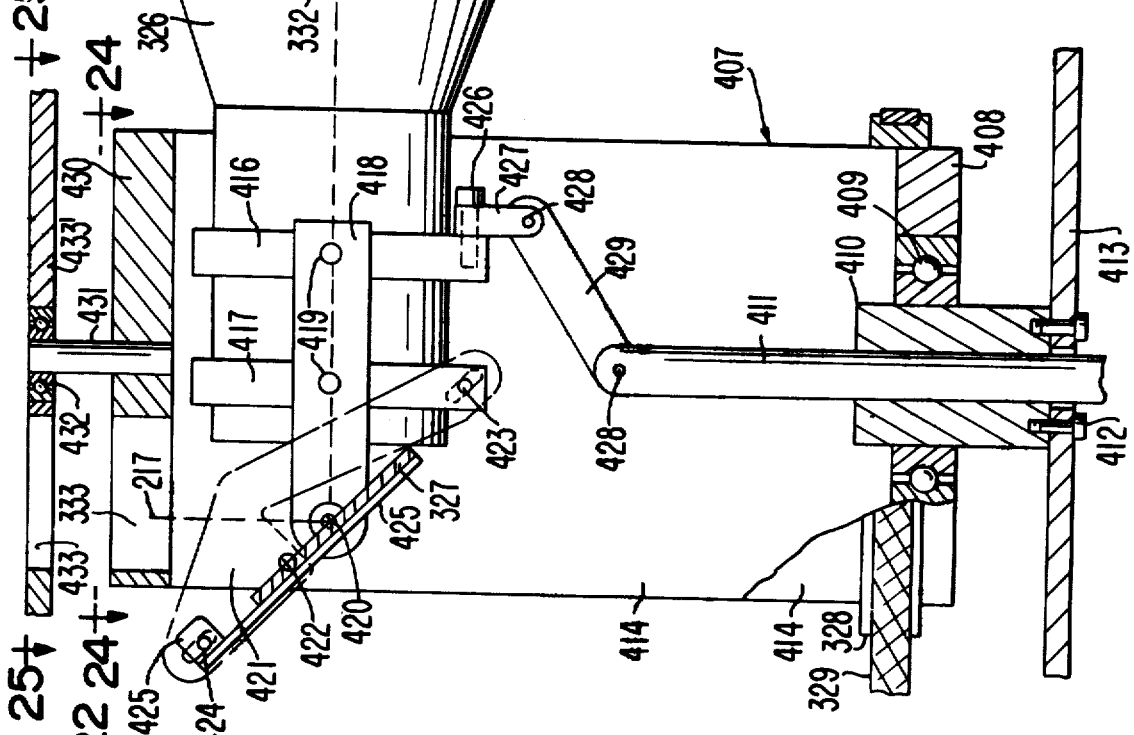

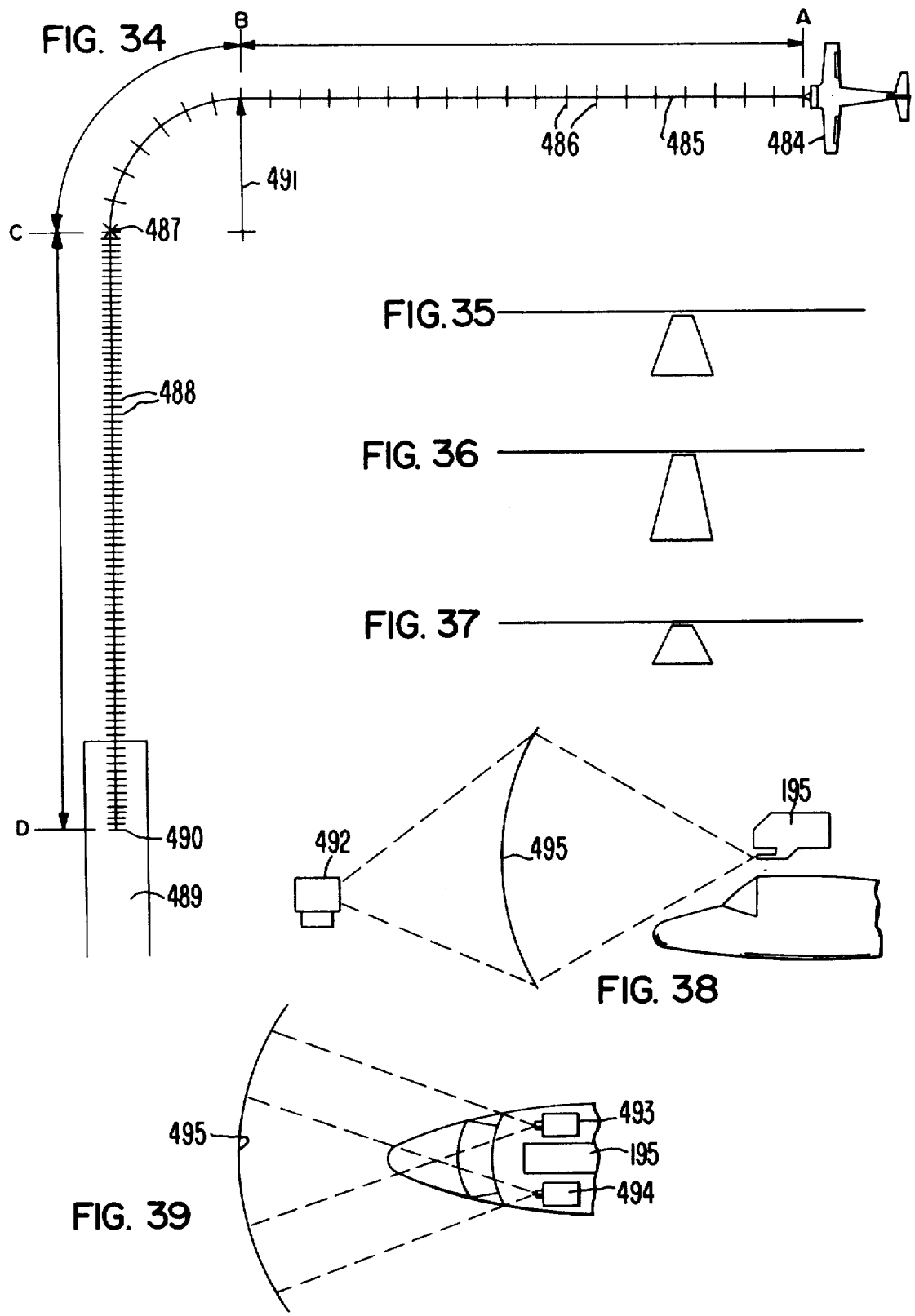

PROJECTOR AND METHOD FOR PROJECTING 360° PICTURES

BACKGROUND

The present invention is directed to a panoramic or 360° projector for projecting panoramic views.

Panoramic cameras and projectors are desirable for producing panoramic visual effects for entertainment, education and training. Typical applications include panoramic pictures in theaters, visual simulators for training aircraft pilots, automobile drivers, radar operators, and the like.

In some of the panoramic camera and projector systems suggested in the past, a number of cameras and projectors are required to produce the entire panoramic image. Consequently, such systems are extremely expensive and involve complex servosystems to coordinate the different cameras and the different projectors.

Attempts to produce the image in a single camera or projector have resulted in extremely complex optical systems which do not truly reproduce a satisfactory image such that compensating auxiliary optical systems are required. Some of these optical systems include spherical or convex reflectors which cannot produce a true image as well as placing a severe damand on tolerances for the different elements of the system. In many of these prior art optical systems the manner of taking and projecting the pictures as viewed from the point where they are to be viewed results in changes in the construction of the projection arena such as modifications of the aircraft cockpit and windshield from the actual existing construction. Alternatively, where the picture is arranged to be back projected such as from the outside of the simulator rather than from the inside thereof, unusually large facilities are required because of the size of the simulator which in some cases can be the actual cockpit of a large jet aircraft.

Still other systems produce only a limited field of view and not a true panoramic view desired to be reproduced.

The object of the present invention is to provide an optical projector and a method which can be economically and accurately used to project a panoramic view, typically 360°, in the form of either a still or motion picture.

Broadly stated, the present invention, as described in greater detail below, is directed to an optical projection method and apparatus for projecting pictures in a 360° panoramic view around a given point wherein an objective lens means having an optical axis is provided for projecting a recorded image existing in the form of an annulus and wherein the optical axis is folded with one axis portion on the recorded image side of the fold substantially normal to another axis portion on the other side of the fold. The annular image is provided either in the form of a picture or a projected image substantially at the focal plane of the objective lens means, and the objective lens means is rotated about a rotational axis substantially parallel to the one axis portion of such optical axis and spaced therefrom by a distance substantially equal to the focal length of said objective lens means.

With this system, an accurate panoramic view is reproduced from a donut shaped image. The image can be produced in a camera which includes imaging optics which are substantially the reverse of the projecting optics provided in accordance with this invention.

The projecting optical system can be positioned above or below the film platen or plane where the image to be projected is located depending upon whether the tops of the objects used in the system are pointing toward the inner or the outer circles of the donut shaped picture.

In accordance with another aspect of the present invention a continuous motion picture projection can be accomplished utilizing a film in the projector containing a series of annular exposures positioned along the film length. The projection system can include one or more optical systems for producing an image at the focal plane of the projection optical system. In this way several images may be combined or images sequentially merged into one another.

In accordance with still another aspect of the resent invention, several image projecting systems can be utilized to produce the image to be projected at the focal plane of the objective lens system and wherein the optical axis of one of such imaging systems can be shifted to be coincident with the optical axis of the projecting lens system thereby to avoid undesired distortion in the projected image.

In accordance with this last aforementioned feature of the present invention, an aircraft simulator for training pilots can be provided wherein a realistic image of the airplane runway is presented to the trainee as he "flies" the simulator toward a landing.

These and other features and advantages will become more apparent upon a perusal of the following specification taken in conjunction with the accompanying drawings wherein similar characters of reference refer to similar structures in each of the several views.

DESCRIPTION OF THE DRAWINGS

FIG. 1 is a plan view of the annulus or donut photographic record projected utilizing the present invention.

FIG. 2 is a schematic vertical layout of an optical plan of a projector in accordance with this invention in which the center line of the projecting optics is directed upward and folded away from the mechanical centerline of the donut image.

FIG. 3 is an overhead view of the optical plan shown in FIG. 2.

FIG. 4 is a schematic vertical optical plan similar to FIG. 2 but in which the centerline of the projection optics is downward.

FIG. 5 is a bottom optical plan of FIG. 4.

FIG. 6 is a schematic vertical optical plan similar to FIG. 2 but in which the centerline of the projection optics is folded through the mechanical center line of the donut image.

FIG. 7 is an overhead view of the optical plan in FIG. 6.

FIG. 8 is a schematic vertical layout of an optical plan for a projector similar to that shown in FIG. 4 but wherein the centerline of the projection optics is folded through the mechanical centerline of the donut image.

FIG. 9 is a lower view of the optical plan in FIG. 8.

FIG. 10 is a schematic view of a projection system similar to that shown in FIG. 8 and utilizing a television screen for establishing the image to be projected.

FIG. 16 is a schematic perspective view of an aircraft simulator utilizing the present invention.

FIG. 18 is a view of a portion of the structure shown in FIG. 17 taken along line 18—18 in the direction of the arrows.

FIG. 19 is a top view of a portion of the structure shown in FIG. 16.

FIG. 22 is an enlarged elevational view, partially in section, of the back side of the projector lens portion of the structure schematically illustrated in FIG. 17 with a counterbalance wieght removed.

FIG. 23 is a reduced view of the structure shown in FIG. 22 showing the counterbalance and lens tilting actuation members at the bottom of the rotatable housing.

FIG. 34 shows a flight pattern being followed by a simulator using the present invention.

FIGS. 35, 36, and 37 illustrate different representations of a landing strip utilizing the present invention in an aircraft simulator.

FIG. 38 is a side elevational schematic view of still another embodiment of the present invention.

FIG. 39 is a schematic plan view of still another aspect of the present invention.

DESCRIPTION OF THE PREFERRED EMBODIMENTS

Figure 11:
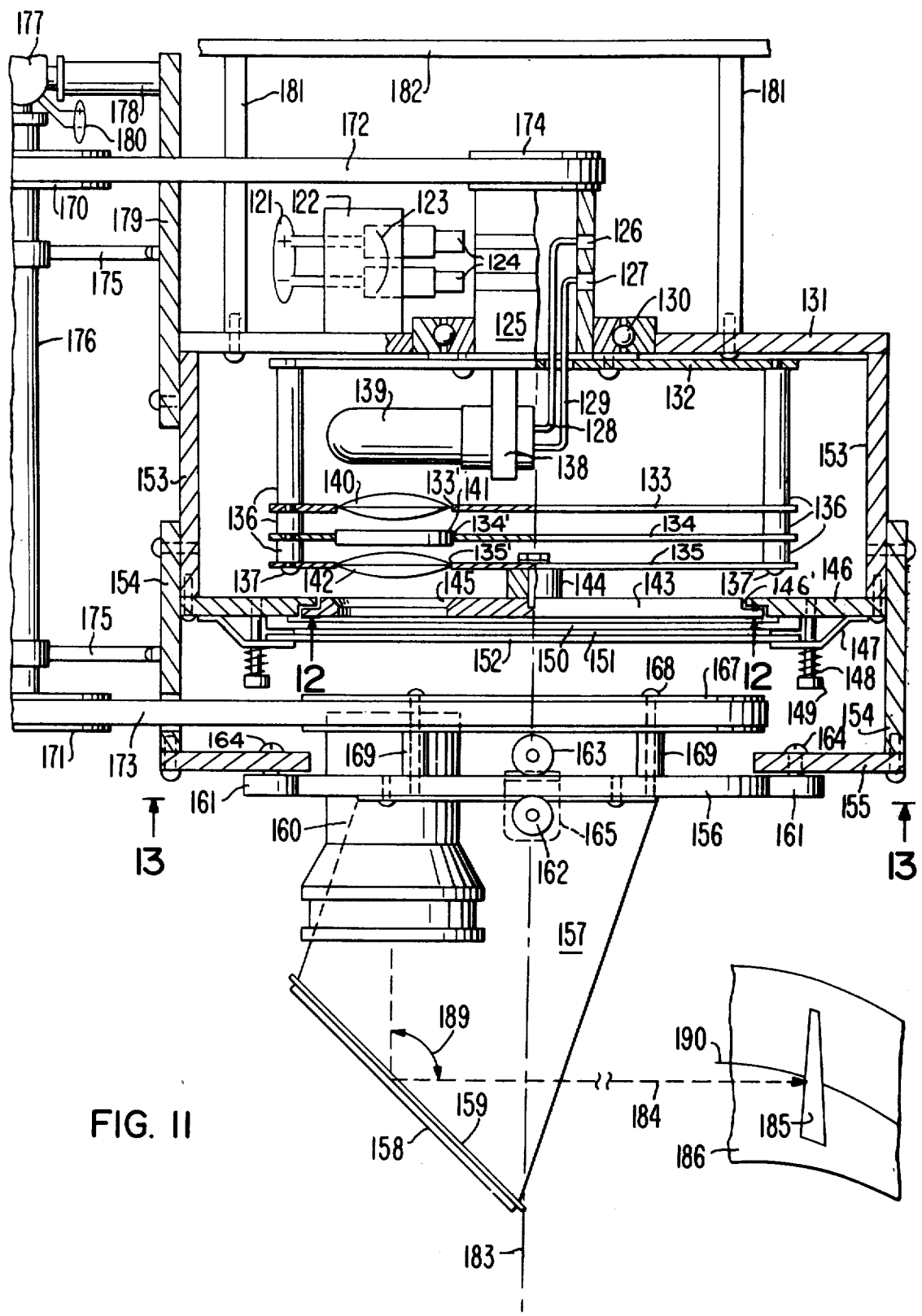
FIG. 11 is a side elevational sectional view of a projection system such as schematically illustrated in FIG. 8.
Figure 12:
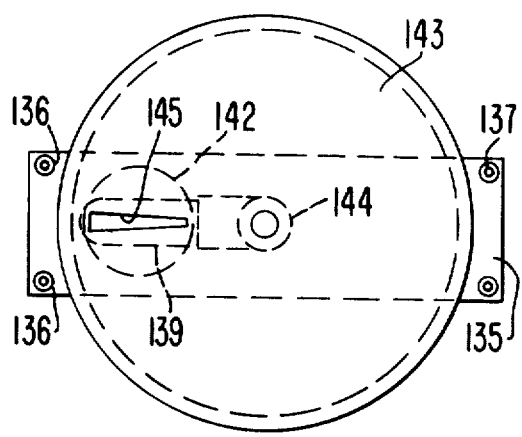
FIG. 12 is a view of a portion of a structure shown in FIG. 11 taken along line 12—12 in the direction of the arrows.

While the projector system in accordance with the present invention is designed to project an image of part or all of a 360° view about the projector regardless of the orientation of the axis of the projector, pictures are most often taken and projected about a vertical axis taking and projecting a view of a horizon radially therefrom. Accordingly the preferred embodiments will be described with respect to a principle vertical axis, but those skilled in the art will appreciate that in many situations the picture will be projected about an axis inclined with respect to the vertical, and some such embodiments will later be described.

FIG. 1 shows a photographic plate 50 with a mechanical center point 51 about which a donut image 52 is described by an inner circle 53 and an outer circle 54 with an image center line 55. Images 56 on the donut 52 are arranged about the record in an angular position equal to the angular position they held in respect to the recording camera. A camera suitable for taking pictures for projection by the present invention involves similar optics to those described for the present invention with the image carried in the reverse direction for recording on photographic film or the like.

In the particular plate 50 taken with a camera having an optical system generally of the configuration of the projector of FIGS. 2 and 3 hereof, the images have their tops toward the inner circle 53. However, they could be arranged with their tops to the outer circle 54 and still be suitably projected by this invention.

FIG. 2 discloses a side elevational schematic view of an optical layout of one such projector possible with this invention. The photographic plate 50 (physically exaggerated in thickness for illustrative purposes) with the donut image 52 has a mechanical center line 58 running perpendicular to the flat plate 50 through center point 51 and to either side of the plate 50. The optical and mechanical elements of the projector are arranged so that travel in a cylindrical path about the mechanical center line 58 and include, but are not limited to, a lamp 59 providing light along an optical center line 73 which passes through the first condenser lens 60, the heat filter 61, the second condenser 62, the photographic plate 50, the wedgeshaped aperture 57, the lens 63 and onto the first mirror 64 where the optical center line 73 is folded from vertical to horizontal and outward or away from the mechanical center line 58 and onto the second mirror 65 where it is folded 90° along the horizontal axis for forming a continuous projected image on screen 66 which typically extends 360° around the center line 58. When these optical elements 57 and 59–65 are rotated with respect to the plate 50 about center line 58, the donut shaped image is reproduced in the form of a 360° view on screen 66 which typically is a surface of a segment of a sphere.

A line image 67 extending radially of the plate 50 is projected through the aperture 57 to the lens entrance as image 68 and is reversed and driven onto the lens exit as image 69, to the surface of the first mirror as image 70, then onto the surface of the second mirror as image 71 and onto the projection screen as image 72 on screen 66. In the embodiment of FIG. 2 the image 67 has its top toward the center point of the plate 50, and the optical center line 73 of the optical projection system projects upward and then outward or away from the center line 58.

FIG. 3 is a schematic plan view of the embodiment of FIG. 2, and demonstrates that a line image 74 extending in the direction of the width of aperture 57 on the donut 52 goes through the aperture 57 and to the lens entrance image 75 where it reverses and exits the lens 63 as image 76, travels to the first mirror 64 where it folds from the vertical portion to the horizontal portion of optical center line 73, proceeds as a radiant away from the center line 58 to the second mirror 65 as image 78 where the optical axis 73 is folded 90° in a horizontal plane and proceeds along this portion of the optical axis to the projected or focus position 79 on the projection screen 66. The second mirror 65 could be mounted 90° from its illustrated position so that it would fold the optical center line long the same horizontal line but opposite the direction illustrated and the image 79 would still be correct on the screen.

FIG. 4 is a side elevational schematic view layout similar to the projection system disclosed in FIG. 2 except that the plate 50' has the donut image 52 on the bottom and the optical center line 73' extends from the line image 67' downward through the wedge aperture 57 to the lens 63 as image 68' where it is reversed by the lens and exits as image 69' onto the first mirror 64 as image 70' and is folded horizontally and away from the center line 58' to the second mirror 65 as image 71' where it is folded 90° in the horizontal plane and projected as the image 72' on the screen 66.

FIG. 5 is a plan view of the layout disclosed in FIG. 4 and shows that a line image 74' in the direction of the width of wedge aperture 57 image passes through the wedge aperture 57 to the lens entrance as image 75' where it is reversed and exits as image 76' and moves onto the first mirror 64 as image 77' where it is folded from the downward vertical path to the outward horizontal path and strikes the mirror 66, forming the image 78' which is directed 90° counterclockwise, in FIG. 5, and forms the projected image 79' on the projection screen 66. As was the case in FIG. 3, the layout in FIG. 5 can be changed so the second mirror 66 directs the image 78' 180° from its illustrated path without changing the final projected image 79'.

FIG. 6 discloses an optical layout in which only a single mirror 64' is required directing the image through rather than away from the center line 58 and in which the top 93 of the image 67'' in the donut image 52 is pointed away from the center point 51. The wedge shaped aperture 57 admits the image to the lens entrance position 68'' where it is reversed at the lens exit as image 69'' and goes to the single mirror 64' as image 70'' where it is directed inward through the mechanical center line 58 and to the projected image position as image 72'' on the screen 66.

FIG. 7 is a schematic plan view of the layout disclosed in FIG 6 showing that an image 74'' directed widthwise of aperture 57 is admitted by the wedge shaped aperture 57 to the lens as image 75'' where it is reversed at the lens exit as image 76'' delivered onto the single mirror 64' as image 77'' where it is folded 90° to the horizontal position and flows through the mechanical center line 58 to the screen 66 as projected image 79''.

FIG. 8 discloses an optical layout in which the image 67''' on the plate points toward the center point 51 and where the optical center line 73''' flows vertically downward folded 90° to horizontal and directed through the mechanical center line 58 by the single mirror 64''. The image 67'''' flows through the aperture 57 to the lens entrance position as image 68''' where it is reversed at the lens exit position as image 69''' and flows to the single mirror 64' as image 70''' and becomes the projected image 72''' on the screen 66.

FIG. 9 is a schematic plan view of FIG. 8 and shows the image 74''' widthwise of the aperture 57 being admitted by the aperture 57 to the lens entrance as image 75''' where it reverses at the lens exit as image 76'''' and flows to the single mirror 64' as image 77''' where it is folded horizontally across the donut image 52 and forms the projected image 79''' on the screen 66.

FIG. 10 discloses a T.V. tube 113 on which the donut image 114 is displayed centered on an axis 58'. A line image portion 116 of image 114 is passed through a field condenser lens 115 for better light control where it is admitted by the wedge aperture 57 to the lens 63 as image 117 where it reverses as it exits as image 118 to the single mirror 64' as image 119 and is folded through the mechanical center line 58' to become the projected image 120 on the screen 66.

FIG. 11 shows the mechanical implementation of the optical layout disclosed in FIGS. 4 and 5 and in which the photographic plate 151 has the images 56 arranged with their tops toward the center point 51 as disclosed in FIG. 1 and the optical path center line 184 extends vertically downward until it is folded by the single mirror 159 horizontally through the mechanical center line 183 to the projection screen 186. It will be understood by those knowledgeable in this art that while the projection screen is ideally a spherical surface and preferably a sector of a sphere, the projection screen 186 can also be cylindrical in shape and have a vertical height sufficient to properly utilize the vertical field of view presented by the particular focal length of the projection lens 160. Further, the mechanical center line 183 of the projector will represent substantially the center point of the cylindrical projection screen 186. Additionally, it will be understood that the included angle 189 formed by the folding of the optical center line 184 at the intersection with the single mirror 159 might be greater than 90° to eliminate the necessity of the projection system being on the horizontal center line 190 of the projection screen 186. Also, if need be, the angle can be less than 90°.

It is important to note that in the original camera imaging optics and in the final projection optics, the distance between the center line 55 of the donut image 52 and the center point 51 of the plate is equal to the focal length of the objective lens. Of course, a field lens optical system can be utilized between the objective lens system and the film plane if a different size film is desired, or the original transparency can be reprinted in an optical printer to produce a transparency of desired size. Such schemes can be utilized if the center line 55 of the final image for projection by the objective projection lens and the optical axis 184 of the objective lens are spaced from the mechanical center line 183 by a distance equal to the focal length of the projector lens.

For the purposes of describing the several embodiments of FIGS. 11–40, it will be understood that the photographic plate 50 and its record of the donut image 52 were made by a camera using a 35mm (or 1.4 inch) focal length lens. The center line 55 of the donut image 52 will be 35mm (or 1.4 inch) from the center point 51 of the plate. The objective projection lens of the projector also has a focal length of 35mm (or 1.4 inch). Thus, in FIG. 11 is disclosed a projector in which the optical center 73 of the lens 160 is 1.4 inch from the mechanical center line 183 and the projection lens has a focal length of 1.4 inch.

To enable rotation of the major elements in the projection system about a rotational axis 183 as described in greater detail below, electrical input to a projector lamp 139 travels through input wires 121 to a brush mounting block 122 and through brush holders 123 to electrical brushes 124 where contact is maintained with commutator 125 input and output rings 126 and 127 respectively where connector input and output wires 128 and 129 respectively extend through the commutator 125 to the lamp 139 in its mount 138. The commutator 125 is rotatably mounted via a bearing 130 in a fixed supporting base plate 131, and is connected by bolts to a rotary base 132 which supports the lamp mount 138, the lamp 139, related optics and the aperture plate 143.

Spacers 136 separate the rotary base 132 from a first condenser mounting plate 133, a heat filter mounting plate 134 and a second condenser mounting plate 135 which are positioned in sequence downward below the lamp, mounted on rotary base 132 by volts 137 and spaced apart by spacers 136 carried on these bolts 137. These plates 133, 134, and 135 are provided with aligned aperture 133', 34', and 135' all centered on an optical axis 184 spaced a given distance from the rotational axis 183 and respectively carrying a first condenser lens 140, a heat filter 141 and a second condenser lens 142 respectively mounted in apertures 133', 134' and 135'. An aperture plate 143 rotating with plates 133, 134 and 135 is carried below plate 135 and bolted thereto with an intermediate spacer 144 for proper positioning with respect to the film mounting plate adjacent thereto. An aperture 145 in aperture plate 143 is aligned with aperture 133', 134', and 135'.

Side walls 153 projecting downward from the fixed supporting base plate 131 surround plates 133, 134 and 135 and hold a fixed film support plate 146 therebelow with a large aperture 146' surrounding plate 143. A glass aperture cover 150 is supported on the film support plate 146 just below the rotating aperture plate 144. A photographic plate 150 with donut image 52 is aligned with its center point 51 in alignment with the mechanical center line and rotational axis 183 of the projector for clamped against the aperture cover 150 by a glass pressure plate 152 therebelow which is spring biased upwardly by a circular pressure clip 147 urged toward plate by a plurality of compression springs 148 on hold down bolts 149 passing through the springs 148 and clip 147 and screwed into plate 146.

Beneath plate 146 fixed side wall supports 154 project downwardly from side walls 153 to support a fixed lens mounting plate 155. The projection lens 160 is mounted on the fixed plate 155 via a rotatable, circular lens mounting plate 156 which is rotatably supported from fixed plate 155 by a plurality of bearings 161, 162 and 163 (See FIG. 11 and 13) and which is provided with an off center aperture 160' for receiving the objective or projection lens 160 and with holes for upwardly projecting bolts 168 to anchor the lens mount pulley 167 atop the spacers 169 on bolts 168. Radial bearings 161 are mounted about the lens mount plate 156 so that it may be rotated horizontally. Bolts 164 operating through the center of the bearings 162 are held by mounts 165 to the fixed lens plate 155 to keep the lens mount plate 156 from dropping downward. Upper bearings 163 are held by mounts 166 to the top of the fixed lens plate 155 to keep the lens mount 156 in alignment against the lower bearings 162. A pair of mirror mount support brackets 157 secured to fixed lens mounting plate 155 project downwardly therefrom and support an inclined mirror mounting plate 158 on the upper surface of which is supported a flat mirror 159. As will be appreciated from the above, the plate 158 and mirror are inclined at about 45° from the optical axis 184.

For rotation of the appropriate elements of the optical system an electric drive motor 177 having electric leads 180 is supported via a mounting bracket 178 to a side support 179 connected to a side wall 153 of the projection housing. A common drive shaft 176 driven by the drive motor 177 is supported on the projection housing by two pillow block bearings 175 and carries upper and lower driver pulleys 170 nd 171 respectively, connected via timer belts 172 and 173 to driver pulleys 174 and 167 respectively. Belt 172 and pulleys 170 and 174 drive the commutator 125 and rotary base plate carrying the lamp 139, condenser lenses 140 and 142, heat filter 141 and aperture plate 143, and belt 173 and pulleys 171 and 167 drive the lens plate 156 and lens 160 and mirror 159 all in unison as if the projection system were a single stationary unit. If the optical elements are initially aligned this rotation results in the aperture 145 tracing a circular pattern equal to the donut image 52 on the photographic plate 141 and the lens 160 projecting the image revealed by the aperture 145 onto the single mirror 159 where it is folded horizontally and projected as image 185 onto the screen 186.

Rotation of the lens will "smear" the projected enlargement on the screen 186. By rotating the projection system at approximately 1,040 RPM, the "smear" will appear to be a solid enlargement of the image 52 360° on the cylindrical screen 186. A slower than 1,000 RPM rotation will present a flickering enlargement, causing headaches, nausea, and possibly triggering epileptic seizures for those so inclined. Rotating above 1,040 RPM will tend to solidify the picture, and approximately 3,000 RPM is accepted as an appropriate maximum RPM for such a presentation.

Figure 14:
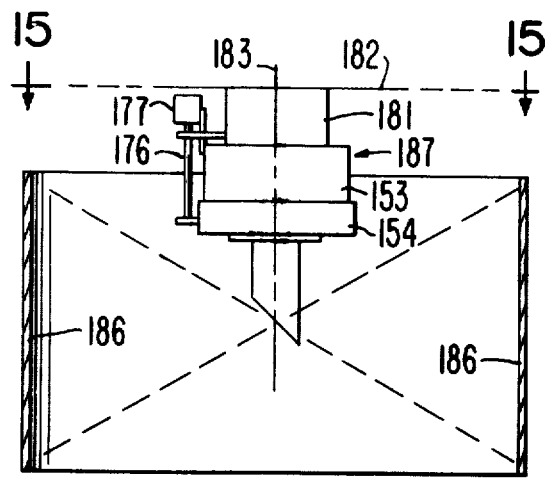
FIG. 14 is a side elevational view showing the operation of the apparatus illustrated in FIG. 11.
Figure 13:
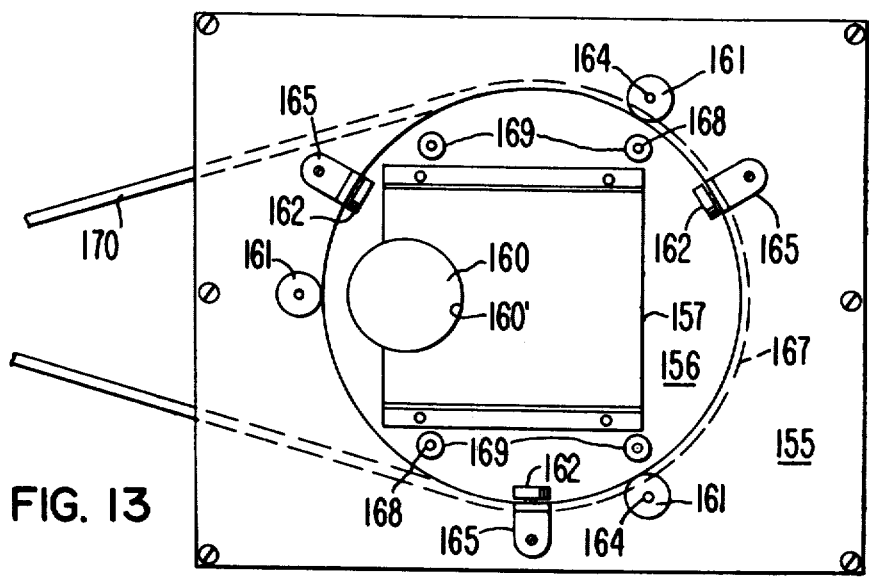
FIG. 13 is a view of a portion of a structure which is shown in FIG. 11 taken along line 13—13 in the direction of the arrows.
Figure 15:
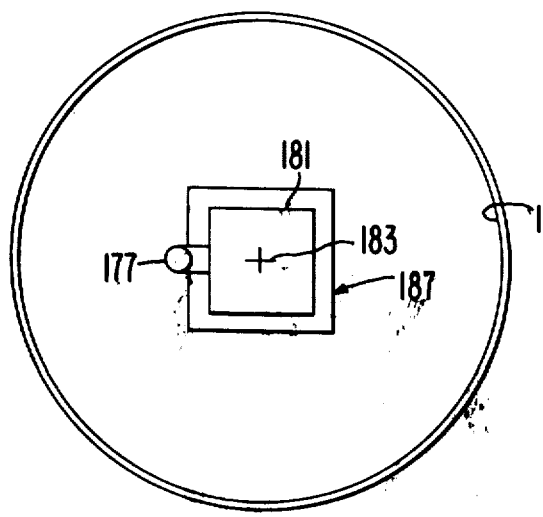
FIG. 15 is a view of the structure shown in FIG. 14 taken along line 15—15 in the direction of the arrows.

FIG. 14 shows a side view of the complete projection unit 187 supported from the ceiling 182 by a mounting housing 181 connected to the supporting base plate 131. The mechanical center line 183 of the projector is the center line about which the cylindrical screen 186 is positioned. FIG. 15 is a plan view of FIG. 14.

The purpose of this projector is to provide a unit which allows economical film consumption, flexible programming of sequences in the film, flexibility in the use of the material in a given frame of material, and a presentation not available from other projectors. The mechanism in this disclosure provides for the projection over a full 360° but can be utilized for projection over any lesser arc. Referring now to FIGS. 16–39 there is shown another embodiment of the present invention ideally suited for aircraft flying instruction. However, those knowledgeable in this art will understand this apparatus can be used for other areas of training, entertainment and simulation.

With particular reference first to FIG. 16 there is shown the optical projector 195 in a support and movement mechanism 196 for use in association with an aircraft simulator having simulator controls 197 and a computer 198. In an aircraft simulation trainer application of this unique projection system, the simulator controls 197 and computer system 198 are well established systems and devices known to those familiar with the art.

In the aircraft simulation controls 197 a movable, substantially vertical, control column 350 provides simulations of the pitch, roll and yaw axes of motion of the real aircraft being simulated. A base or deck pivot point 352 at the lower end of control column 350 provides for forward and backward motion of this column 350, and a control yoke 351 at the upper end provides simulation of the left and right bank characteristics of the plane. Left and right rudder pedals 353 and 354, respectively, provide simulation of yaw motion.

Sensors (not shown) on the aircraft simulation controls 197, the column 350, the yoke 351, and the foot pedals 353 and 356 provide an electronic input to the computer 198 which generates the signals to the simulator instruments to indicate to the student pilot his flight characteristics and his engine statistics. This simulator computer 198 also provides signals to the projector unit 195 and its mount 196 sufficient to allow the student pilot to see the visual effects (or simulation) provided by the projector which will match the condition indicated by the aircraft instruments.

In the support and movement mechanism 196 as seen in FIG. 16, a vertical tubular support column 355 anchors the entire projection unit 195 and its related mounts in position. A vertical tubular dolly 356 is free to move up or down the vertical column 355 thereby to position the projection unit 195 in accordance with instructions from the computer 198. A dolly cable 358 has one end secured to an anchor mount 357 on the dolly 356, moves over a pulley 359 mounted on the column 355 and passes inside the vertical column 355 where it is connected to a cable reel and control motor (not shown).

Bolts 360 anchor a vertical gimbal ring 361 to the vertical dolly 356, and pivot pins 362 on the vertical gimbal ring 361 pivotally support a horizontal gimbal ring 363 therefrom. The projection unit 195 is in turn pivotally supported from the horizontal gimbal ring 363 via a pair of pitch pivot pins 364. A fixed brace 365 on gimbal ring 361 serves as a mount for one end of a bidirectional cylinder 366 the other end of which is anchored via a pivot joint 367 on the horizontal gimbal ring 363, and actuation of this cylinder 366 provides bank motion to the projection unit 195. Pitch motion is provided by a bidirectional cylinder 369 one end of which is connected to the projection unit 195 by a fixed brace 368 and the other end of which is pivotally mounted via a pivot joint 370 onto the horizontal gimbal ring 363.

Figure 17:
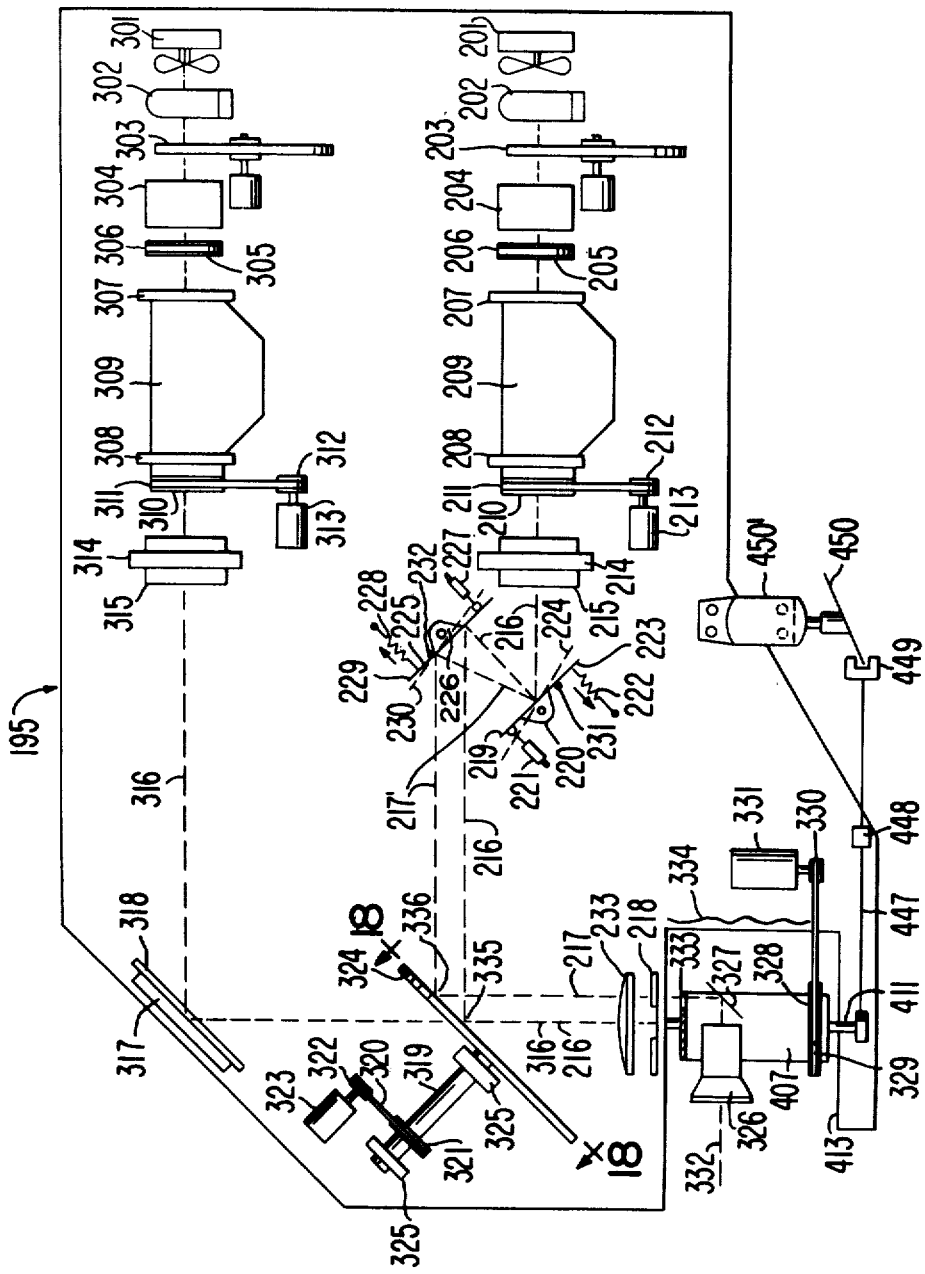
FIG. 17 is a side elevational view schematically illustrating the projection apparatus illustrated in FIG. 16.

As schematically illustrated in FIG. 17, the projection unit 195 includes three optical assemblies, an upper system assembly consisting of elements 301–317 for passing light along an upper optical center line 316, a lower assembly consisting of elements 201–232 for passing light along a lower optical center line 216, and the objective projection assembly consisting of elements 326–331 for directing light along the projection lens center line 332. In the upper system a fan 301 cools a projection lamp 302. A rotatable disc shutter 303 controls light from lamp 302 to a condenser and heat filter system 304 and thence to a filmstrip 305 held at the focal plane by the aperture system 306. Rear and front bearings 307 and 308 respectively hold a dove prism 309 used to rotate the image on the filmstrip 305. The prism 309 is rotated by a timer belt 311 with a pulley 310 on the front of the prism 309, and the belt is driven by a drive pulley 312 on a drive motor 313. A mount 314 holds a lens 315 on the upper center line following the prism 309. The upper optical center line 316 flows horizontally through the system from the lamp 302 through the shutter 303, condenser and filter system 304, aperture 306, filmstrip 305, prism 309 and lens 315 to an inclined, downwardly reflecting mirror 318 in a mount 317 at the front top of the projector frame. At the mirror the horizontal optical center line 316 is folded 90° downward where it passes through a dissolve mirror 324 (see FIG. 18) to be described in greater detail below. The upper lens 315 is focused so as to generate a suspended aerial donut image 218 at the lower front edge of the projector frame, and a field condenser lens 233 may be positioned on the optical axis just prior to the aerial image 218 to "columnize" the light rays creating the aerial image 218.

A projection lens 326 on projection optical center line 332 is rotatably mounted at the lower front end of the projection unit 195 (see FIG. 17) for scanning the aerial image 218. In this embodiment scanning is accomplished by folding the optical path 332 of the projection lens 326 from a vertical orientation parallel with the vertical portion of center line 316 to a horizontal orientation where lens 326 is located by the use of an inclined mirror 327 mounted with lens 326 on the lens rotatable housing 407. The housing 407 is rotated by a driven pulley 328, a timer belt 329, a driver pulley 330, and its electric motor 331 at some acceptable speed between 1,000 RPM and 3,000 RPM. A wedge shaped aperture 333 atop the rotatable lens mounting housing allows the lens 326 to scan the aerial image 218 in a circular pattern, projecting the image carried on the filmstrip 305 onto a spherical screen 371 (see FIG. 19). In this instance, it is not necessary to have much more than 245° of simultaneous projection since the student in a trainer aircraft cannot look directly behind himself. For convenience, and not because of necessity, the lower frame structure 334 blocks off some 100° of projection behind the student.

The dissolve mirror 324 (FIGS. 17 and 18) through which the upper system optical center line 316 passes and off of which the lower optical center line 216 is reflected is a circular partially transmitting, partially reflecting disc with a center hole 372 for mounting on shaft 319 rotatably held in place by bearings 325 at each end. The mirror is rotated by a timer belt 320 driving a driven pulley 321 on shaft 319 from a driver pulley 322 connected to a drive motor 323. If the mirror 324 were divided ½ clear and ½ coated, about 3,000 RPM of the mirror enables the upper optical center line 316 to pass through during ½ revolution and the lower optical system 216 to reflect off the lower surface during the other ½ revolution to provide dissolving images for the projection lens 326. If you divide the mirror into ¼ sections, the same effect can be achieved with 1,500 RPM and for ⅛ divisions the RPM would be 375. With 1/16 divisions and 375 or more RPM, an object projected along the upper optical center line 316 and passing through the transparent portion of the dissolve mirror 324 can be formed at the aerial image location 218, and when the projected object is reflected off the mirrored portion, no aerial image is formed. Concurrently an image projected along the lower optical center line 216 will pass through the transparent portions and never reach the aerial image location but will bounce off the mirrored sections, travel downward and form an image at the exact same aerial image location 218 as the upper lens 315 is focused upon.

In the lower projection system, a fan 201, a lamp 202, a shutter 203, a condenser and heat filter system 204, an aperture 206 holding a filmstrip 205, bearings 207 and 208 holding a dove prism 209 which is rotated by its driven pulley 210, timer belt 211, driver pulley 212, and power motor 213 with a lens mount 214 and lens 215 duplicate the upper system. The lower optical path 216 differs from the upper path 316 in that it may be driven along a primary path 216 or an alternate path 217.

The primary path 216 intersects the upper optical center line 316 at a point 335 on the lower front surface of the dissolve mirror. For shifting an image between the primary path 216 and the alternate path 217 first and second, facing, movable mirrors 219 and 225 respectively are positioned along the optical path between the lens 215 and the dissolve mirror 324. An image on the lower filmstrip 205 will pass through the lens 215 and strike the first movable mirror 219 where it will be folded upward to the second movable mirror 225, where it will again be folded and travel along path 216 toward the dissolve mirror 324. The first movable mirror 219 is mounted on a pivot point 220 which allows a tension spring 222 to hold the mirror 219 against an adjustable stop 231. A solenoid 221 can be actuated, moving the mirror 219 from its primary position 223 to its secondary position 224. The result of the solenoid 221 repositioning the mirror 219 is to direct the primary optical center 216 to its alternate path 217. The second movable mirror 225 is pivot mounted at 226 so that its tension spring 228 can hold the mirror 225 against its adjustable stop 232. The repositioning of the second adjustable mirror 225 and the first adjustable mirror 219 develops the alternate optical center line 217 which is parallel to and higher than the primary optical center line 216. The alternate optical center line 217 passes through the center line of the suspended aerial image 218 and is utilized to shift the runway image as described in greater detail below.

Above, it was revealed that the lens must travel in a cylindrical path over the donut image 52 (FIG. 1) so that the optical center line of the lens will be perpendicular to and directly over the center line 55 of the donut image 52. Further, it was disclosed that the distance from the center point 51 to the center line 55 is equal to the focal length of the camera lens which made the picture, and the projection lens has a focal length equal to the focal length of the camera lens. For the purposes of this disclosure a 35mm or 1.4 inch lens has been considered as the camera and projector optics. For the purpose of FIG. 17, the donut image on the filmstrip 205 and 305 has been reduced from its original 4.5 inch diameter to 2.250 inch diameter and the filmstrip itself has been reduced from 5 inch film to 70mm perforated. The enlarging lens 215 and 315 enlarge the filmstrip 205 and 305 image from its 2.250 inch diameter to the full 4.5 inch diameter at the suspended aerial image 218 position.

Referring to FIG. 16, the computer 375 has input cables 376 and output cables 377. The input cable 376 accepts input or instruction from the aircraft simulator controls, the column 350, the yoke 351, the foot pedals 353 and 354, and the engine throttle 378. The computer, as known to one familiar with the art, accepts an analog input from the simulator controls and either converts the input to digital or acts upon the input as analog information. If the computer is digital it will convert results of its computation from digital back to analog. Taking a constant input from all input sensors, the computer feeds a constant output to flight instruments to tell the student what his simulated air speed is, his rate of climb and bank position and direction is, and all other related data. The output cable 377 feeds the results of the computer computation to the various displays, i.e., air speed, bank, gyro, etc., and provides similar output to the projection unit 195.

If the student pulls back on the yoke 351 and column 350, the input cable 376 carries a message to the computer 375 telling how far back the column 350 is leaning. The computer looks at air speed, power setting, etc., and determines the simulator would be in a certain pitch angle. This pitch angle is displayed on the flight instruments and is fed by the output cable 377 to the projection unit 195 where the signal is directed to the bi-directional cylinder screw 369, which will be extended, causing the projector unit 195 to pitch forward about its pivot bar 364. The pitching forward will present to the student seated at the simulator controls the visual effect of "nosing up" in the aircraft in accordance with the action being displayed on the flight instruments in the simulator. If the student rotates the yoke 351 to the right, the input cable 376 carries the amount of rotation to the computer 375 which determines the amount of bank an actual airplane would have at that air speed, etc., and through the output cable 377 drives the flight instruments before the student and sends signals to the bank bi-directional cylinder 366, which extends from its normal position, pivoting the horizontal gimbal ring 363 on its pivot pins 362, leaning the projection unit 349 to its left, giving the proper visual input to the student that the simulator is "flying" to the right. As the student depresses the right 354 and left 355 foot pedals, the computer 375 determines the changes in "heading" the actual aircraft would have taken and provides the proper input to the students display (gyro) and simultaneously to the drive motors 213 and 313 for the dove prisms 209 and 309.

Looking along the optical center lines 216 and 316 from the lamp to the lens positions, if the top of the donut image 52 on the filmstrip 305 indicates north, rotation of the dove prism 209 and 309 in response to the computer 375 signals in a clockwise direction, as a result of the student depressing the left foot pedal 353, will cause the dove prism 209 and 309 to rotate the optical image formed along the center line 216 and 316 in a clockwise direction, indicating to the student that the direction of aircraft rotation is counterclockwise, as directed by the left foot pedal 353. It will be understood by those knowledgeable in the optics arts that 1° rotation of the dove prisms 209 and 309 will cause 2° rotation of the optical image along the optical center lines 216 and 316 and that instructions from the computer 375 will take this fact into its calculations.

Figure 26:
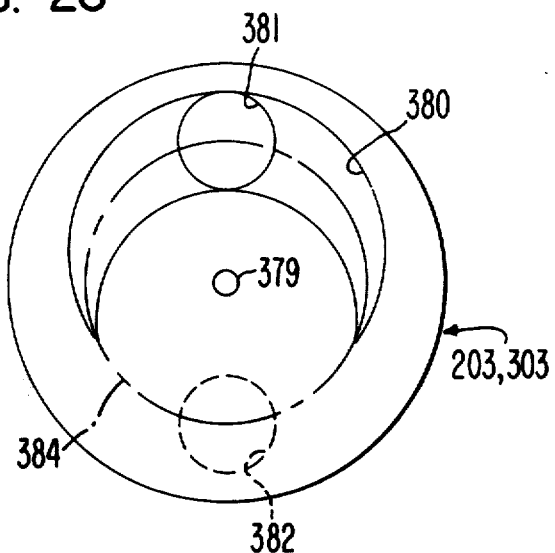
FIG. 26 is an enlarged view of a portion of the structure shown in FIG. 17.
Figure 27:
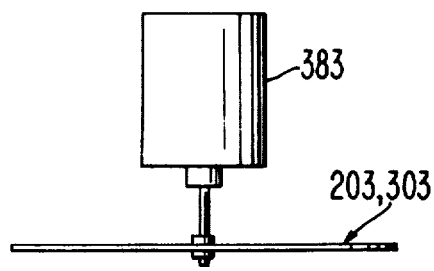
FIG. 27 is an enlarged view of another portion of the structure shown in FIG. 17.

Each shutter 203 and 303, as seen in FIGS. 26 and 27, is a rotary device with the window outline 380 being shaped in a double-tear configuration with the sphere of the tears being overlapped, forming the "open" 381 lens position and the tapered portions being formed around a center line 384. The "closed" 382 lens position 382 is 180° around the center line 384 and is spaced so that a complete diameter of the lens position 382 exists on either side of the primary closed lens position as a solid material to prevent light leakage through the window 380 during advancement of the filmstrip 305 from one frame to another. As can be seen from FIGS. 17, 26 and 27, if the lower shutter 203 is rotated until the lens is at the "closed" 382 position and the upper shutter is rotated until the lens is at the "open" position 381, then the donut 52 image in the upper filmstrip 35 will be seen through the projection lens 326. If the shutter drive motors 383 are controlled by the computer 374 so that they both rotate one revolution in 1 second, the image from the upper filmstrip 305 will fade out at exactly the same rate the image from the lower filmstrip 205 fades on by reason of a pear-shaped window outline 380 in the shutters 203 and 303. By stopping the rotation of the shutter drive motors 383 after ½ revolution of rotation, the computer 375 has "dissolved" from one frame to the next.

As one knowledgeable in the art of motion picture photography knows, as long as the aircraft being simulated by this system is being taxied along the taxi ways or making a take off or landing, the photography generating the filmstrips 205 and 305 must be made at motion picture rates, i.e., 16 to 24 frames per second. However, as the aircraft being simulated rises above the ground, i.e., removes itself from an immedate or nearby point of reference, the frames of photography information can be further and further apart. There is a specific formula in optics physics which says that the rate of frames being photographed or projected is a function of height, i.e., distance to the ground as a point of reference, and air speed. By way of an example derived from actual experience, a student flying at a simulated altitude of 3,000 feet above ground level can be shown forward motion as a function of a dissolve rate of 2.5 seconds per frame. If the simulated air speed is 100 mph the forward rate of motion is approximately 528,000 feet an hour or 8,800 feet per minute, or approximately 146 feet a second. In a 2.5 second dissolve rate the actual visual input from a frame is 1.25 seconds, if actual forward motion is achieved from this process. At 146 feet per second the simulated forward motion in 1.25 seconds equals 182.5 feet. At motion picture framing of 16 frames per second, the forward motion would be 9.1 feet per frame. At 24 fps the forward motion would be 6.09 feet per frame. As compared to 16 fps, this dissolve system requires 1/20 the number of frames of the standard motion procedures. At 24 fps, this dissolve system requires 1/30 of the number of frames of the standard motion procedures.

Figure 20:
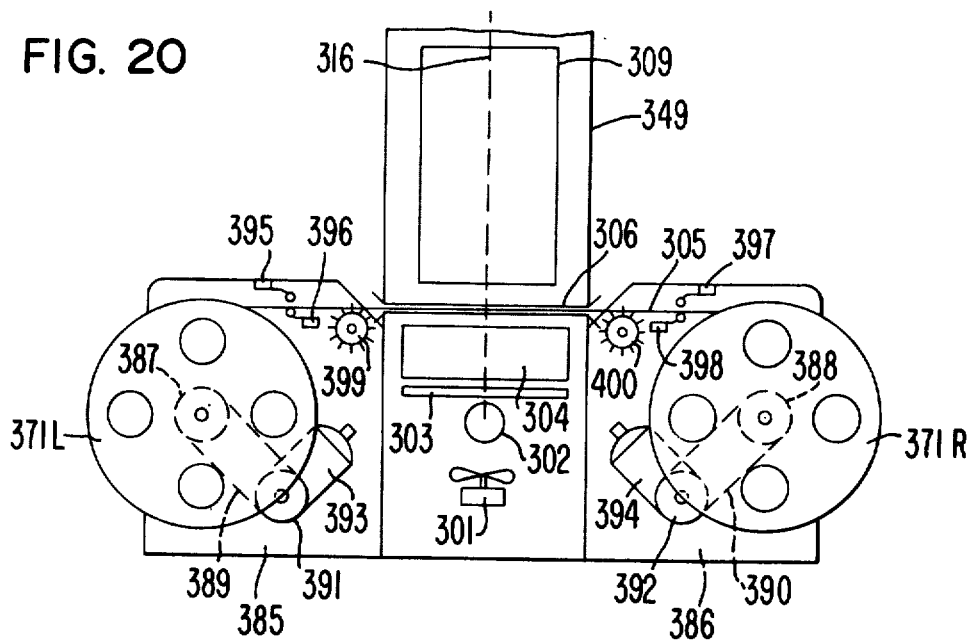
FIG. 20 is a schematic plan view of a portion of the structure shown in FIG. 17.

Referring to FIG. 20 we see an overhead view of the rear of the projector system 349. The fan 301, the lamp 302, the shutter 303, the condenser and heat filter 304, the aperture 306 and the dove prism 309 as well as the optical center line 316 can be seen. A left 385 and right 386 film reel support holds the top left 371L and right 371R film reels and related components. Drive motors 393 and 394 with their pulleys 391 and 392 drive timer belts 389 and 390 which rotate the driven pulleys 387 and 388 to rotate the film reels 371L and 371R. These drive motors 393 and 394 have their direction of rotation controlled by the computer 375 and their duration of operation controlled by the film micro switches 395, 396, 397 and 398. The left film sprocket 399 and right film sprocket 400 are operated simultaneously and in the same direction of rotation by signals from the computer 375. Additionally, the film sprockets 399 and 400 are reversible in their direction of rotation at any given frame and they operate upon signal from the computer 375 at any cyclic rate up to 24 frames per second. Film slack and tension microswitches 395 and 396 are positioned between the left film reel 371L and left sprocket 399 and similar slack and tension microswitches 397 and 398 are positioned between right film reel 371R and right sprocket 400.

If the film sprockets 399 and 400, under direction of the computer 375, drive the film 305 from the left film reel 371L to the right 371R and there is a small amount of tension in the film 305 between the left sprocket 399 and the reel of film 371L, the left start microswitch 396 is actuated and the power circuit to the left drive motor 393 is turned on, causing more film to be unwound from the left reel 371L. When a slack condition in the film 305 between the left sprocket 399 and the reel 371L exists, the brake microswitch 395 is actuated and the "brake" circuit in the drive motor 393 is turned on and the reel 371L is kept from unwinding additional film because the motor does not coast to a stop but instead is braked electrically. As the film 305 flows out the right side the projector 349, a surplus of film 305 will actuate the slack microswitch 397 and turn on the circuit to the right drive motor 394, causing the reel 371R to wind up the film 305 until tension between the sprocket 400 and the film reel 371R actuates the tension microswitch 398, turning off the drive motor 394 and electrically braking it. When the computer 375 reverses the direction of rotation of the reels 371R and 371L, the direction of film 305 flow and the output of the leads of the microswitches 395, 396, 397, and 398 are also reversed so that the drive switches 396 and 397 become brake switches and brake switches 395 and 398 become drive switches. Those familiar with this will recognize these reversible, electrical braking motors and their reversible control switches are off the shelf components and electrical circuits.

Figure 21:
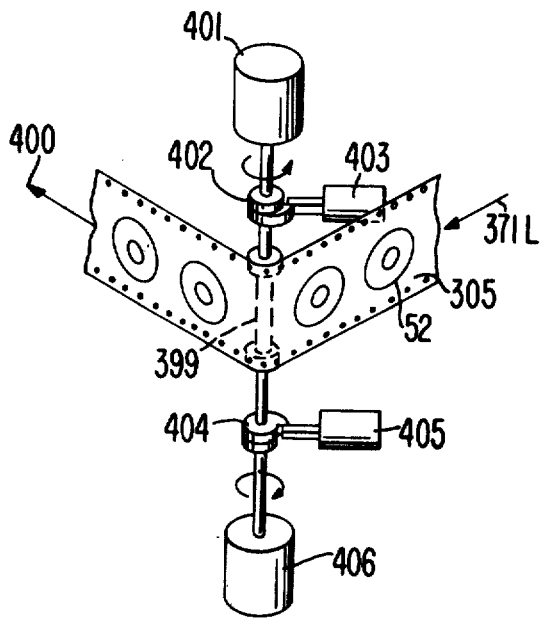
FIG. 21 is a schematic perspective view of a portion of the structure shown in FIG. 20.

Referring to FIG. 21, the left film reel 371L is supplying film 305 with its donut images 52 past the left film sprocket 399 toward the right film sprocket 400. In this direction of film flow 305 a lower sprocket drive motor 406 is making rotational power available through a slip clutch 404 with a detent. A solenoid 405, operated by the computer 375, allows the sprocket to be driven clockwise, as viewed from above, one rotation or one frame per signal. If the film flow is reversed an upper sprocket drive motor 401 supplies rotational power through a slip clutch with detent 402 which is actuated by the computer 375 controlled solenoid 403. The right film sprocket 400 is powered by an identical system as used to power the left sprocket 399. The lower film reels 372L and 372R are similarly equipped.

FIG. 22 shows an enlarged back side view of the lens rotational unit 407 schematically shown in FIG. 17 with the left side 414 removed. A bottom plate 408 has a bearing insert 409 therein with a hollow support shaft 410 therewithin bolted via bolts 412 to the top base plate 413 of the projection unit 195. Plate 413 projects forwardly from the lower frame structure 334 underneath the rotatable lens housing 407 to support the same. Within hollow shaft 410 a center shaft 411 is free to rotate and move up and down, moving a lens tilting arm 429 pivoted by a pin 428 at the lower end to shaft 411 and at the upper end by a pin 428 to a bracket arm 427 connected by a bolt 426 to a front lens holder 416. This front lens holder 416 and a rear lens holder 417 are connected by bolts 419 to a lens pivot frame 418 which swings around a pivot pin 420 in the left and right sides 414 and 415 of the housing 407. This pivot pin 420 intersects the vertical portion of optical center line 217 which passes through the donut image 218 center line. The folding mirror 327 in a mounting plate 425 also pivots so that its reflective surface is at the center of the lens holder pivot pin 420. A bell crank 421 for moving mirror mounting plate 425 pivots on pins 422 on the left and right sides 414 and 415 of the housing 407 and is connected to the mirror mount 425 on pins by a swivel pin 424 which moves radially with the bell crank 421, which itself swivels about a pivot pin 423 on the rear lens holder 417.

Downward motion of the center shaft 411 lowers the front of the lens 326, which lowers the rear holder 417 and produces a lowering clockwise rotation of pivot pin 423. This clockwise rotation introduces a clockwise motion of the mirror swivel pin 424 about the bell crank 421 swivel pin 422. The incoming vertical optical center line 217 will always be reflected directly into the lens 326 to become the projector lens optical center line 332 because the mirror 327 will always be moved so as to make the same angle with the vertical optical center line 217 and the projection lens 326 optical center line 332 intersecting on the surface of the mirror 327.

As shown in FIG. 23 the center shaft 411 has a detent groove 442 in which a steel ball 443 rides as it is held in position by a set screw 444 screwed through a swivel block 445. The circular motion of the center shaft 411 as it rides in the rotational unit 407 allows the swivel 445 to control up-down motion of the center shaft 411 without restricting the circular motion. A moment arm 447 is anchored to the swivel block 445 by another set screw 446. As shown in FIG. 17, the moment arm 447 is pivoted at 448 near its center section and has a "C" jaw 449 on the opposite end. A cam 450 operating in the "C" jaw 449 has a travel in 180° of rotation equal to the total vertical travel of the center shaft 411. A cam electric drive motor 450' is bi-directional and variable speed, responding as to direction and speed to signals from the flight computer 375.

Referring to FIG. 23, a counterbalance weight 435 (removed in FIG. 22) is bolted to a swing arm 436 which is anchored to the housing sides 414 and 415 by pivot pins 437. Bolts 440 anchor a counterbalance actuator arm 439 to the counterbalance weight 435, and a linking arm 441 connects the actuator arm 439 to the center shaft 411. Moving the center shaft 411 up or down moves the lens 326 and the counterbalance weight 435 up and down together, tending to keep the lens rotational unit in balance.

Figure 24:
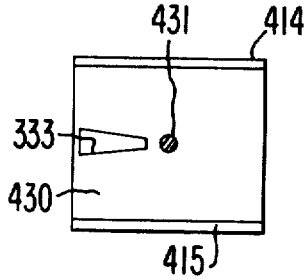
FIG. 24 is a reduced sectional view of a portion of the structure shown in FIG. 22 taken along line 24—24 in the direction of the arrows.

FIG. 24 is a top view of the top plate 430 showing the left 414 and right 415 sides, the center pin 431 and the aperture 333.

Figure 25:
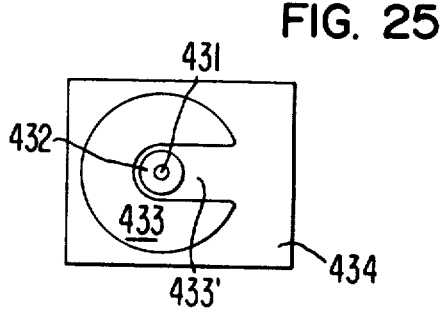
FIG. 25 is a reduced view of a portion of the structure shown in FIG. 22 taken along line 25—25 in the direction of the arrows.

FIG. 25 shows the upper support plate 434 of the projection unit 195 above the projection lens housing 407 and with the almost complete annular opening 433 located beneath the aerial image location 218 and with an arm 433' holding a bearing 432 which rotatably supports the center pin 431 projecting upwardly from apperture plate 430 at the top of the rotatable lens housing 407. One knowledgeable in the art will realize that the arm 433' blocking off the annular opening 433 toward the front of the projection unit 349 blocks out only that portion of the donut image 52 that is also blocked by the lower frame structure 334 when the lens is pointing rearward.

Figure 28:
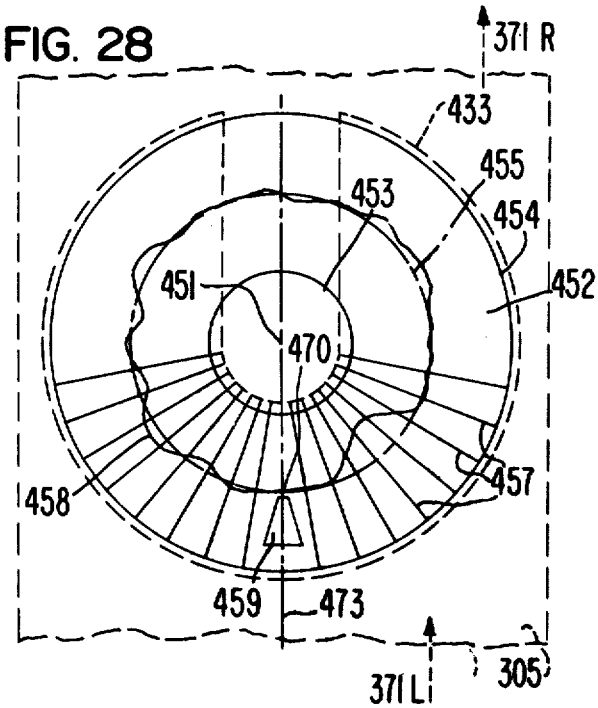
FIG. 28 is a view of a picture to be projected with the present invention and schematically illustrating the location of that picture relative to the aperture location in the projector assembly.
Figure 29:
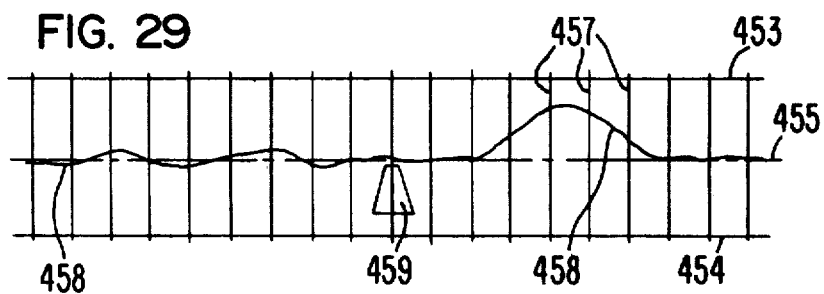
FIG. 29 is a schematic view of the image of FIG. 28 laid out flat.
Figure 40:
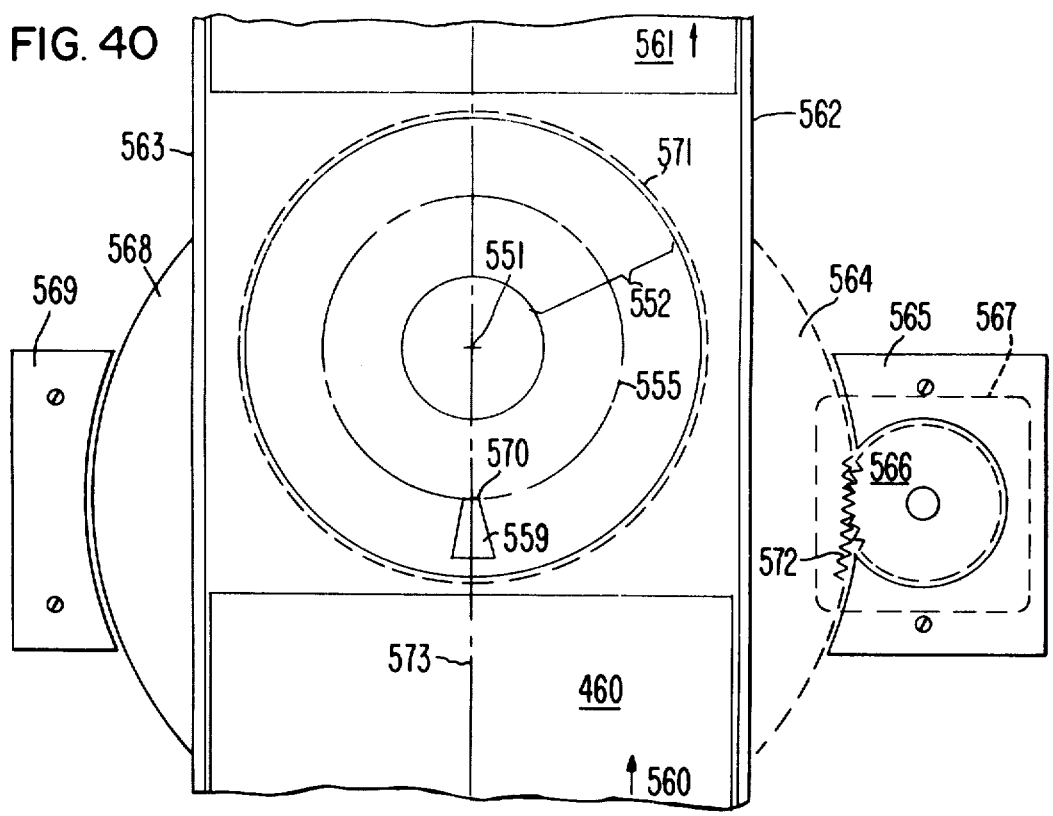
FIG. 40 is a plan view of structure using still another aspect of the present invention.

As with the donut image originally shown in FIG. 1, the donut image 452 shown in FIG. 28 for the aircraft simulator has a center point 451 about which the donut image is described by an inner circle 453, which is the top of the field of view to be projected, an outer circle 454, which is the bottom field of view, and a center line 455, an imaginary reference line above which in the particular reconstructed scene the projector lens is rotated and generally along which the horizon 458 is recorded. For the purposes of this disclosure, radiants 457 which are 10° apart are drawn on the donut image 452. In FIG. 29 the donut image 452 in FIG. 28 has been laid out flat as if it has been projected. The radiants 457 are now 10° apart at the center line 455 and are parallel from the vertical limits 453 to the bottom limits 454. A runway 459 appears as it does when the student is lined up for a landing and is out some distance from touchdown. If this donut image 452 is in the projection unit 195 and the student pilot depresses the left foot pedal 353 and then the right foot pedal 354, the runway 459 will drift right and then left to visually indicate the misalignment with the runway 459. This misalignment with the runway 459 is displayed as a difference in radial headings and not as a deviation in off-axis guide slope presentation.

Figure 30:
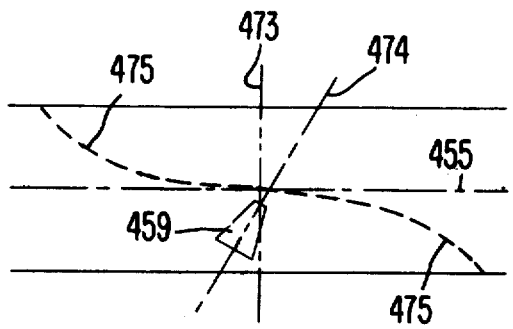
FIG. 30 is a schematic view illustrating the operation of one optical projection utilizing only certain aspects of the present invention.

In FIG. 28 the donut image is shown with its center point 451 located over the projector aperture 471. This image 452 is derived from part of a filmstrip 305 flowing from the supply spool such as 381L to the take-up reel such as 317R so for illustrative purposes the film 305 is shown in FIG. 28 as if it were over the projector aperture 433. The center point 451 is in the exact center of the optical center line 216 and 316 of the projection unit 195. If the student operates the foot pedals 353 and 354, the dove prisms 209 and 309 rotate to optically shift the runway 459 right or left as the case may be. If in this case (as can be the case using optical center line 217 as described in greater detail below), the mechanical rotation by the dove has as its center point 470 a spot on the center line 455 where it is intersected by the mechanical center line 473 of the film flow, the projected runway 459 can be displaced to the left as shown in FIG. 30. The mechanical center line 473 is displaced to 474, as well as the image center line 455 is displaced to 475. Thus the utilization of an alternate center point 470 for the glide slope approach provides a means of allowing the student pilot to drift right or left of the runway while providing a correct visual input to the student. While the alternate center point 470 may be positioned anywhere along the mechanical center line 473, including clear across the donut image 452, the position 470 selected for this disclosure pivots the projected image about the horizon and runway center lines, where the student is looking to as point of reference.

As seen in FIG. 30, the horizon 458 which lies basically along the center line 455 is moved out of position because of the new center point 470 of rotation in shifting or rotating clockwise has moved the horizon 458 on the right side of the donut image 452 below the projector center line 455, and on the left side the horizon 458 has been moved above the center line 455. Thus, in the projected image (FIG. 30) the horizon on the right is projected low and on the left the horizon appears high generally along new center line 475 and the horizon appears approximately level just beyond the runway area, and less and less so as the amount of deviation is increased.

Figure 31:
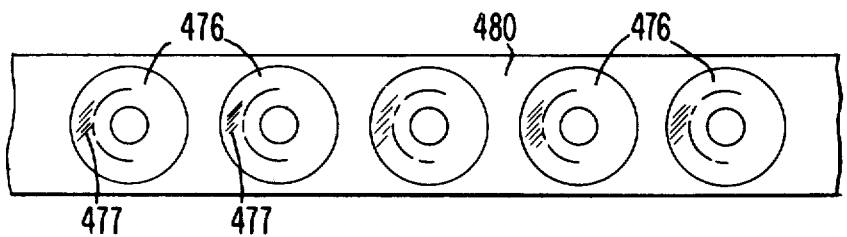
FIG. 31 shows a motion picture strip of certain images.

FIG. 31 shows a motion picture strip 480 made of donut images 476 in which the runway has been erased photographically and the area 477 has been muted or blended to match the surrounding area. Any one of several photographic special effects can be used to achieve this effect, as one knowledgeable in that art will recognize.

Figure 32:
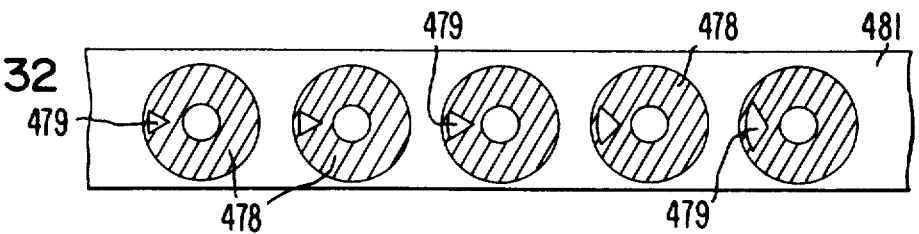
FIG. 32 shows a motion picture strip of other images.

FIG. 32 shows a motion picture strip 481 made of donut images 478 in which all but the runway 479 has been blocked out.

Referring to FIG. 17, if the film with the background pictures 480 is loaded into the upper projection system aperture 306 and the film with only the runway 481 not blocked out is loaded into the lower projection aperture 206 and the projection unit 195 is run at 24 frames per second it can be seen that the superimposed films 480 and 481 will be enlarged and collected as a single aerial image 218 for the projection lens 326 to project.

If in the process of projecting the superimposed images, the student pilot drifts left or right of the runway center line, the computer 375 will instruct the lower dove prism 209 to rotate clockwise or counterclockwise, driving the runway off center to provide the proper stimulus to the student pilot. Rotation of the lower dove prism 206, however, will generate a radial change in the location of the runway 479 without providing adequate left or right orientation to the runway.

Figure 33:
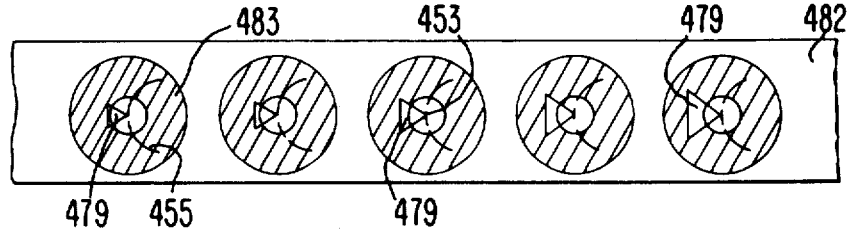
FIG. 33 shows a motion picture strip of still other images.

In FIG. 33 a circular image 483 is created in which a regular donut print with a runway is blocked out except for the runway and then the image center line 455 is placed over the center point 453 of the circular image 483 and just the runway is reproduced. A filmstrip 482 of these images 483 is generated and placed in the lower aperture 206 of the projector unit 195 (FIG. 17). With the runway 479 in the circular image 483 projected in the lower system, the glide slope pivot point 470 identified in FIG. 28 is now resting on the lower optical center line 216 (FIG. 17). This means that the rotation of the lower dove prism 209 will swing the runway 479 in a circular path, apparently pivoted on its far end, or actually pivoted on the runway center line and horizon intersection. However, the runway 479, as rotated in the filmstrip 482 with the new centered pivot point 453 will appear at the top of the projection screen because of its new position between the center line 455 and center point 453 unless otherwise corrected.

As indicated in FIG. 17 there is provided in the lower projection optical center line 216 a first 219 and second 225 movable mirror system. By means of these two mirrors 219 and 225, the original optical center line 216 can be repositioned along a new path 217. It is of extreme importance that this new path 217 be of the exact length of that portion of the original path 216; otherwise the suspended image 218 will not be in focus at exactly the same position 218 as the upper projection center line 316. In this system, the first and second movable mirrors 216 and 217 determine a new optical path 217 which is 1.4 inches above the original path 216; thus when the new optical path 217 is folded by the dissolve mirror 325 downward it assumes a path 1.4 inches parallel and rearward of the original superimposed optical paths 216 and 316. This means that the background filmstrip 480 in the upper system is not disturbed by the left or right displacement of the runway 479 in the runway film 482 in the lower system. Thus, if the computer 375 energizes the movable mirror solenoids 221 and 227 at the start of this film and rotates the lower dove prism 209 in response to off-glide slope deviation, then the horizon or center line 475 displaced in FIG. 30 cannot occur.

With the film 480 with the washed out runway loaded in the upper projector system 371L and 371R and the film 482 with the washed out background and centered runway loaded in the lower system 372L and 372R, the computer 375 can be programmed for a landing sequence. The computer 375 can be programmed to know the elevation and distance from touchdown of each photograph in the filmstrips 480 and 482. In FIG. 34 we see a plan view of an airplane 484 starting down a flight path 485 to be projected by the visual system. Along the first part of the flight path 485, the dissolve positions 486 will be used at 1/2 second intervals to provide forward motion. The student will have been told that he is three-fourths of a mile south of the runway and that he is to fly a three-quarter mile base leg (A to B) and make a 600 foot radius turn (B to C) onto final (C to D) and make the touchdown 490 500 feet down from the end of the runway 489. The student will have been told to fly his simulator until the instruments read: barometer 29.9 (set by hand), altitude 3,700 feet (using a 3,000 above sea level runway), air speed 75 miles per hour, rate of climb 0—, directional gyro 90° due east. When the computer 355 gets an input from the aircraft instruments as just specified it will turn the projection unit 349 on. The student will be told to reduce throttle settings until he has dropped an average of 10 feet per second or reduced his altitude fo 3,400 feet as he enters final 487.

As shown in FIG. 16, the cam 450 will normally operate the projection lens 348 in a downward altitude of 10°, since the projection unit 349 will be mounted above the students head and this downward pitch is necessary to drop the projected image to proper eye level. As the student controls the simulator along the flight path 485, the computer will compare the indicated altitude with the known altitude of the photographs being projected and if there is significant deviation will instruct the drive motor 451 to rotate the cam 450 and control the up or down angle of the projection lens 348 in order to give a visual input to the student that he is not flying the intended flight path 485.

When the student flies to the top of the final approach 487, the projection unit 195 will shift into full motion. The computer 375 will compare the photograph altitude roster with the simulator altitude and if there is a significant difference will respond. FIG. 35 shows a representation of a runway when the photographs and simulator are at a similar altitude. FIG. 36 shows a representation of the same runway when the simulator is above the photographic glide slope. In this case, the computer response was to instruct the vertical dolly 356 upward while instructing the drive motor 451 and cam 450 assembly to keep the projection lens 348 aimed at the same spot on the spherical screen. The effect of raising the projector while lowering the lens 348 angle is to produce keystoning — or in this case, elongation of the runway — as it would appear from a higher altitude. FIG. 37 shows a representation of the same runway when the simulator is flying too low for the photographic record, or making the approach too low. In this case, the computer response was to instruct the vertical dolly 356 to lower the projection unit 195 closer to the simulator top while keeping the projection lens 348 aimed at the same spot on the screen.

As schematically illustrated in FIG. 34, the number of different pictures displayed on the final approach is increased because being closer to the ground relative changes are more noticeable.

FIG. 38 shows how the projection unit 195 and an auxiliary projector 492 can be used simultaneously to present a composite picture on the screen 495. The auxiliary projector 492 may be a duplicate of the lower projection system in the projection unit 195 and mounted so as to produce greater vertical movement than might be practical with the projection unit 195 or its vertical dolly 356.

FIG. 39 shows the projection unit 195 being aided by a right 493 and left 494 auxiliary projector which could be used by the instructor to superimpose other aircraft taxiing or flying into the path of the student pilot. The use of a second image forming optical system for subsequent projection by the projection lens with a shiftable axis such as shifting from axis 216 to 217 can be incorporated in a projection system of the type shown in FIGS. 11 and 14.

The images can be superimposed optically in several different ways either to combine along the optical axis of the projection system or to combine on the projection screen. One such system would be the provision of a similar projector to that shown and designated as 187 in FIGS. 14 and 11 and wherein the other projector is located below and projects upwardly underneath projector 187. Such projector could utilize the structure of FIG. 40 for positioning the film at the focal plane of the projection optics and including film transport sides 562 and 563 mounted on right and left rotary members 564 and 568 which rotate in right and left rotary guides 565 and 569. The right rotary member 564 has gear teeth 572 which are engaged by a drive gear 566 powered by a drive motor 567 in turn controlled such as by a computer. If the computer drives the gear 566 counterclockwise, the rotary sides 564 and 568 slide in their guides 565 and 569 leaning the transport side 562 and 563 to the right and leaning the runway 559 also to the right about the center point 570. This construction accomplishes the same thing as rotation by the dove prism in the previous embodiment where the lower optical system had its axis shifted from optical center line 216 to optical center line 217.

What is claimed is:

1. An optical reproduction apparatus comprising:
    objective lens means for projecting a recorded image and having an optical axis,
    said optical axis folded and having one axis portion on the recorded image side of the fold substantially normal to another axis portion on the other side of said fold,
    means for establishing an annular image to be projected substantially at the focal plane of said objective lens means, and
    means for rotating said objective lens means about a rotational axis substantially parallel to said one axis portion of said optical axis and spaced therefrom by a distance substantially equal to the focal length of said objective lens means.

2. The optical reproduction apparatus in accordance with claim 1 including:
    a wedge shaped aperture for defining a portion of the annular image viewed by said objective lens means, on extension, the sides of said wedge shaped aperture means intersecting at said rotational axis.

3. The optical reproduction apparatus in accordance with claim 1 wherein:
    said other axis portion of said optical axis intersects said rotational axis.

4. The optical reproduction apparatus in accordance with claim 1 wherein
    said other axis portion of said optical axis extends away from said rotational axis at said fold and
    a mirror folding the optical axis between said axis portions.

5. The optical reproduction apparatus in accordance with claim 1 including means for imaging said annular image at the focal plane of said objective lens means.

6. The optical reproduction apparatus in accordance with claim 5 including means for rotating said annular image about the axis of said annulus.

7. An optical reproduction apparatus comprising:
    a screen substantially surrounding a given view position,
    objective lens means for projecting a recorded image and having a folded optical axis with a screen portion substantially normal to the recorded image portion at the fold,
    means for establishing at substantially the focal plane of said objective lens means a substantially annular image,
    means for rotating said objective lens means about a rotational axis substantially parallel to said recorded image portion of said optical axis and spaced therefrom by a distance substantially equal to the focal length of said objective lens means, and
    means for projecting portions of said annular image along said optical axis to said screen as said optical axis rotates about said rotational axis for establishing the projected image on said screen.

8. The optical reproduction apparatus in accordance with claim 7 wherein said screen portion of said optical axis intersects said rotational axis.

9. The optical reproduction apparatus in accordance with claim 7 wherein:
    said screen portion of said optical axis extends away from said rotational axis at said fold, and
    a mirror folding the optical axis between said axis portions.

10. The optical reproduction apparatus in accordance with claim 7 including means for imaging said annular image at the focal plane of said objective lens means.

11. The optical reproduction apparatus in accordance with claim 10 including means for rotating said annular image about the axis of said annulus.

12. An optical reproduction apparatus comprising:

objective lens means for projecting a recorded image and having an optical axis, said optical axis folded and having one axis portion on the recorded image side of the fold substantially normal to another axis portion on the other side of said fold, means for imaging substantially at the focal plane of said objective lens means at least two superimposed annular images to be projected, means for rotating at least one of said annular images about the axis of said annulus, and means for rotating said objective lens means about a rotational axis substantially parallel to said one axis portion of said optical axis and spaced therefrom by a distance substantially equal to the focal length of said objective lens means.

13. An optical reproduction apparatus comprising:

objective lens means for projecting a recorded image and having an optical axis, said optical axis folded and having one axis portion on the recorded image side of the fold substantially normal to another axis portion on the other side of said fold, means for imaging substantially at the focal plane of said objective lens means at least two superimposed annular images to be projected, means for rotating at least one of said annular images about an axis other than the axis of said annulus, and means for rotating said objective lens means about a rotational axis substantially parallel to said one axis portion of said optical axis and spaced therefrom by a distance substantially equal to the focal length of said objective lens means.

14. The optical reproduction apparatus in accordance with claim 13 wherein said image rotating means includes means for rotating said one image about the recorded image side portion of said optical axis.

15. The optical reproduction apparatus of claim 13 including means for shifting an image produced by said image projecting means from an optical axis coincident with the annulus axis to said other axis.

16. The optical reproduction apparatus of claim 15 wherein said other axis is coincident with the recorded image side portion of said optical axis.

17. An optical reproduction apparatus comprising:

objective lens means for projecting a recorded image and having an optical axis, said optical axis folded and having one axis portion on the recorded image side of the fold substantially normal to another axis portion on the other side of said fold, means for imaging substantially at the focal plane of said objective lens means at least two superimposed annular images to be projected, said means for imaging at least two superimposed annular images including at least two imaging optical systems each including a film containing a series of annular exposures along the length thereof, and means for rotating said objective lens means about a rotational axis substantially parallel to said one axis portion of said optical axis and spaced therefrom by a distance substantially equal to the focal length of said objective lens means.

18. The optical reproduction apparatus in accordance with claim 17 wherein the exposures on said film lengths are nonredundant exposures.

19. The optical reproduction apparatus in accordance with claim 17 wherein the exposures on one of said film lengths includes one portion of the ultimate picture to be projected and the exposures on anther film length contain other portions of the picture to be projected.

20. An optical reproduction apparatus comprising:

objective lens means for projecting a recorded image and having an optical axis, said optical axis folded and having one axis portion on the recorded image side of the fold substantially normal to another axis portion on the other side of said fold, means for establishing an annular image to be projected substantially at the focal plane of said objective lens means, means for rotating said objective lens means about a rotational axis substantially parallel to said one axis portion of said optical axis and spaced therefrom by a distance substantially equal to the focal length of said objective lens means, and means for rotating lens means, said image establishing means and said objective lens rotating means about three mutually perpendicular axes for shifting the projected scene for an observer.

21. An optical reproduction apparatus comprising:

objective lens means for projecting a recorded image and having an optical axis, said optical axis folded and having one axis portion on the recorded image side of the fold substantially normal to another axis portion on the other side of said fold, means for imaging by projecting at the focal plane of said objective lens means at least two superimposed images, means for rotating at least one of said images about the axis of said annulus, and means for rotating said objective lens means about a rotational axis substantially parallel to said one axis portion of said optical axis and spaced therefrom by a distance substantially equal to the focal length of said objective lens means.

22. An optical reproduction apparatus comprising:

objective lens means for projecting a recorded image and having an optical axis, said optical axis folded and having one axis portion on the recorded image side of the fold substantially normal to another axis portion on the other side of said fold, means for imaging by projecting at the focal plane of said objective lens means at least two superimposed images, means for rotating at least one of said annular images about an axis other than the axis of said annulus, and means for rotating said objective lens means about a rotational axis substantially parallel to said one axis portion of said optical axis and spaced therefrom by a distance substantially equal to the focal length of said objective lens means.

23. The optical reproduction apparatus in accordance with claim 22 wherein said image rotating means includes means for rotating said one image about the recorded image portion of said optical axis.

24. The optical reproduction apparatus of claim 22 including means for shifting an image produced by said image projecting means from an optical axis coincident with the annulus axis to said other axis.

25. The optical reproduction apparatus of claim 24 wherein said other axis is coincident with the recorded image portion of said optical axis.

26. An optical reproduction apparatus comprising:
objective lens means for projecting a recorded image and having an optical axis,
said optical axis folded and having one axis portion on the recorded image side of the fold substantially normal to another axis portion on the other side of said fold,
means for imaging by projecting at the focal plane of said objective lens means at least two images,
means for rotating at least one of said images about the axis of said annulus, and
means for rotating said objective lens means about a rotational axis substantially parallel to said one axis portion of said optical axis and spaced therefrom by a distance substantially equal to the focal length of said objective lens means.

27. The optical reproduction apparatus in accordance with claim 26 wherein the exposures on said film lengths are nonredundant exposures.

28. The optical reproduction apparatus in accordance with claim 26 wherein the exposures on one of said film lengths includes one portion of the ultimate picture to be projected and the exposures on another film length contain other portions of the picture to be projected.

29. An optical reproduction apparatus comprising:
a screen substantially surrounding a given view position,
objective lens means for projecting a recorded image and having a folded optical axis with a screen portion substantially normal to the recorded image portion at the fold,
means for establishing at substantially the focal plane of said objective lens means a substantially annular image;
means for rotating said objective lens means about a rotational axis substantially parallel to said recorded image portion of said optical axis and spaced therefrom by a distance substantially equal to the focal length of said objective lens means,
means for projecting portions of said annular image along said optical axis to said screen as said optical axis rotates about said rotational axis for establishing the projected image on said screen, and
means for rotating said objective lens means, said image establishing means and said objective lens rotating means about three mutually perpendicular axes for shifting the projected scene for an observer.

* * * * *